(12) United States Patent
Thankappan et al.

(10) Patent No.: US 9,882,805 B2
(45) Date of Patent: Jan. 30, 2018

(54) DYNAMIC PATH SELECTION POLICY FOR MULTIPATHING IN A VIRTUALIZED ENVIRONMENT

(71) Applicant: VMware, Inc., Palo Alto, CA (US)

(72) Inventors: Sudhish Panamthanath Thankappan, Bangalore (IN); Jinto Antony, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 760 days.

(21) Appl. No.: 14/041,389

(22) Filed: Sep. 30, 2013

(65) Prior Publication Data
US 2015/0095445 A1 Apr. 2, 2015

(51) Int. Cl.
G06F 15/167 (2006.01)
H04L 12/729 (2013.01)
H04L 29/08 (2006.01)
H04L 12/707 (2013.01)
G06F 9/455 (2006.01)

(52) U.S. Cl.
CPC ............ H04L 45/125 (2013.01); H04L 45/22 (2013.01); H04L 67/1097 (2013.01); *G06F 9/45533* (2013.01)

(58) Field of Classification Search
CPC ............... G06F 9/45533; H04L 45/125; H04L 67/1097; H04L 45/22; H04L 47/122; H04L 47/22; H04L 47/24; H04L 47/2458; H04L 47/263; H04L 47/30; Y02B 60/31
See application file for complete search history.

(56) References Cited

U.S. PATENT DOCUMENTS

| | | | | |
|---|---|---|---|---|
| 6,002,676 A | * | 12/1999 | Fleming | H04J 1/12 370/320 |
| 7,437,493 B2 | * | 10/2008 | Pecone | G06F 13/385 710/110 |
| 7,778,157 B1 | * | 8/2010 | Tawri | G06F 11/2005 370/216 |
| 2003/0172331 A1 | * | 9/2003 | Cherian | G06F 11/2092 714/712 |

(Continued)

OTHER PUBLICATIONS

Epping, Duncan, "Pluggable Storage Architecture, exploring the next version of ESX/vCenter," http://www.yellow-bricks.com/2009/03/19/pluggable-storage-architecture-exploring-the-next-version-of-esxvcenter/; 7 pgs., Mar. 9, 2009.

(Continued)

*Primary Examiner* — Yves Dalencourt

(57) ABSTRACT

Particular embodiments change a current storage I/O path used by a host computer to access networked storage to an alternative storage I/O path by considering traffic load at a networked switch in the current storage I/O path. The host computer transmits a request to the networked switch in the current storage I/O path to provide network load information currently experiences by the networked switch. After receiving network load information from the networked switch, the host computer then evaluates whether the networked switch is overloaded based on the received network load information. Based on the evaluation, the host computer selects a new alternative storage I/O path to the networked storage that does not include the networked switch, and then forwards future storage I/O communications to the networked storage using the new alternative storage I/O path.

15 Claims, 3 Drawing Sheets

(56) References Cited

U.S. PATENT DOCUMENTS

| | | | |
|---|---|---|---|
| 2004/0053624 A1* | 3/2004 | Frank | H04L 47/14 455/453 |
| 2004/0064293 A1* | 4/2004 | Hamilton | G06F 11/3409 702/182 |
| 2005/0229034 A1* | 10/2005 | Fujibayashi | G06F 11/0727 714/11 |
| 2006/0004918 A1* | 1/2006 | Lubeck | H04L 41/0853 709/223 |
| 2006/0174087 A1* | 8/2006 | Hashimoto | G06F 9/5077 711/173 |
| 2007/0130344 A1* | 6/2007 | Pepper | G06F 3/0613 709/227 |
| 2008/0163207 A1* | 7/2008 | Reumann | H04L 63/0263 718/1 |
| 2009/0031057 A1* | 1/2009 | Ghosalkar | G06F 3/0613 710/38 |
| 2010/0054129 A1* | 3/2010 | Kuik | H04L 47/10 370/235 |
| 2010/0061244 A1* | 3/2010 | Meier | H04L 12/2867 370/236 |
| 2010/0188263 A1* | 7/2010 | Cornwall | G01D 4/006 340/870.03 |
| 2011/0110381 A1* | 5/2011 | Atkinson | H04L 47/125 370/419 |
| 2013/0086583 A1* | 4/2013 | Uemura | G06F 9/45533 718/1 |
| 2013/0185715 A1* | 7/2013 | Dunning | G06F 9/45558 718/1 |
| 2015/0334024 A1* | 11/2015 | Mogul | H04L 47/22 370/237 |

OTHER PUBLICATIONS

Hogan, Comac, "vSphere 5.0 Storage Features Part 10—VASA—vSphere Storage APIs—Storage Awareness," http://blogs.vmware.com/vsphere/2011/08/vsphere-50-storage-features-part-10-vasa-vsphere-storage-apis-storage-awareness.html; 5 pgs., Aug. 19, 2011.

Hogan, Comac, "Path Failure and related SATP/PSP behavior," http://blogs.vmware.com/vsphere/2012/07/path-failure-and-related-satppsp-behaviour.html; 5 pgs., Jul. 23, 2012.

Hogan, Comac, "Pluggable Storage Architecture (PSA) Deep-Dive—Part 1," http://cormachogan.com/2013/02/04/pluggable-storage-architecture-psa-deep-dive-part-1/; 8 pgs., Feb. 4, 2013.

VMware, Inc., "ESXi and vCenter Server 5 Documentation > vSphere Storage > Understanding Multipathing and Failover > VMware Multipathing Module," http://pubs.vmware.com/vsphere-50/index.jsp?topic=%2Fcom.vmware.vsphere.storage.doc_50%2FGUID-9DED1F73-7375-4957-BF69-41B56C3E5224.html; 3 pgs. (printed from website on Sep. 23, 2013).

* cited by examiner

DYNAMIC PATH SELECTION POLICY FOR MULTIPATHING IN A VIRTUALIZED ENVIRONMENT

BACKGROUND

An enterprise-level virtualized computing environment may include multiple host computers, each running a hypervisor that abstracts the host computer's processor, memory, storage, and networking resources into logical resources for multiple virtual machines running on the host computer. The computing environment also may include networked storage in the form of one or more disk arrays and controllers, in order to consolidate data storage for the virtual machines. The hypervisor handles I/O for the multiple virtual machines (VMs) by sending data to (and retrieving data from) logical disks created on the disk arrays. As further detailed below, a hypervisor in a host computer that supports "multipath I/O" functionality in this type of virtualized computing environment is able to direct I/O requests through one of a number of storage I/O paths from a particular virtual machine to a particular logical disk. This multipath I/O functionality provides, for example, failover capability (e.g., an alternate path can be selected in the case of failure of a controller, port, or switch on the current path between a host computer and a disk array), as well as load balancing capability (i.e., distribution of storage I/O traffic between available paths). Multipath I/O may provide other various benefits and advantages, such as fault tolerance, decreased latency, increased bandwidth, and/or improved security.

FIG. 1A depicts an example enterprise-level virtualized computing environment providing conventional multipath I/O. In the example environment 100, each host computer 110 includes one or more host bus adapters (HBA) 116, wherein each HBA 116 has one or more ports 117. In the embodiment of FIG. 1A, each port 117 enables a host computer 110 to connect to one of two switches 120A or 120B (e.g., Fibre Channel switches, etc.), which, in turn, are connected to ports 138A or 138B of one of controller 136A or 136B for a storage area network (SAN) 130. As depicted in FIG. 1A, each host computer 110 has a number of different paths (e.g., combinations of host computer ports, switches, and storage controller ports) through which I/O communication can reach SAN 130.

Each host computer 110 may run a hypervisor 112, such as, for example, the vSphere Hypervisor from VMware, Inc. ("VMware"), that enables such host computer 110 to run a number of VMs. A VM running on host computer 110 may access and perform I/O on a "virtual disk" that is stored as a file on one of LUNs 134 exposed by SAN 130. Each hypervisor 112 includes a multipathing module (MPM) 114, which enables the hypervisor to direct outgoing storage I/O traffic in accordance with appropriate path selection policies and also chooses alternative paths for I/O if a current path fails. For example, VMware's Pluggable Storage Architecture (PSA) in vSphere Hypervisor includes a Native Multipathing (NMP) module (NMP) that enables an administrator to specify a path selection policy to use when host computer 110 performs I/O on behalf of ones of its VMs. For example, the policy may specify fixed preferred path which is used to perform I/O so long the preferred path remains available. If the preferred path fails, the NMP module may select an alternative path but return to the preferred path once it is restored. Alternatively, the policy may specify a "most recently used" (MRU) path. With an MRU policy, even if a prior path is restored after a failure, the chosen alternative path remains the path that continues to be used since it then is the most recently used path. Another alternative policy may be a "round robin" path selection policy in which hypervisor 112 continually rotates through all available storage I/O paths for load balancing purposes.

To date, current multipathing modules implement path selection policies such as the above fixed, MRU and round robin path selection policies, are "static" in nature and do not take into account changes in dynamic conditions within environment 100. For example, as shown in FIG. 1A, if both of hypervisors 112 are individually performing load balancing between switches 120 using the round robin path selection policy without any consideration of load or I/O throughput at the switches, it is entirely possible that, despite the fact that storage I/O traffic from the hypervisors on host computer 110A has already heavily loaded switch 120A, the MPM 114 for the hypervisor 112B may still select a path to SAN 130 through switch 120A, rather than selecting an alternate path to SAN 130 through lightly-loaded switch 120B.

SUMMARY

Particular embodiments change a current storage I/O path used by a host computer to access networked storage to an alternative storage I/O path by considering traffic load at a networked switch in the current storage I/O path. The host computer transmits a request to the networked switch in the current storage I/O path to provide network load information currently experiences by the networked switch. After receiving network load information from the networked switch, the host computer then evaluates whether the networked switch is overloaded based on the received network load information. Based on the evaluation, the host computer selects a new alternative storage I/O path to the networked storage that does not include the networked switch, and then forwards future storage I/O communications to the networked storage using the new alternative storage I/O path.

Particular embodiments are performed by a multipathing module in a hypervisor of the host computer that supports the running of multiple virtual machines on the hypervisor.

In particular embodiments, the request is transmitted and the network load information is received through an out-of-band channel between the host computer and the switch, wherein the out-of-band channel is separate from a network used by the host computer and networked storage to conduct I/O.

In particular embodiments, the evaluating step further comprises comparing the received network load information against a threshold value. In particular embodiments, the threshold value is a maximum ratio of load at the networked switch in the current storage I/O path to an average load at any other network switches along any alternate paths between the host computer and the networked storage.

In particular embodiments, the evaluating step further comprises requesting network load information from other networked switches that are networked to the host computer and the networked storage and comparing network load information of the other networked switches to the network load information of the networked switch in the current storage I/O path.

In particular embodiments, the selecting step further comprises identifying a second networked switch that is more lightly loaded than the networked switch in the current storage I/O path.

DETAILED DESCRIPTION

Embodiments described herein enable a hypervisor to improve multipath I/O, for example, in a virtualized environment by implementing a dynamic path selection (DPS) policy that dynamically changes a path used by a host computer to reach networked storage in the computing environment by considering traffic characteristics, such as load and I/O throughput, that occur at switches establishing the paths from host computers to networked storage in order to distribute storage I/O traffic more evenly across a storage network. A multipathing module (MPM) of the hypervisor may be able to query the switches to obtain switch information, such as configuration, status, and load. Configuration information for the switch may include the maximum benchmarked capacity for each switch (e.g., a maximum frame rate of 148,800 frames per second over a 100-Mbps 802.3 LAN port). The MPM may monitor switch load (e.g., with respect to a set value for threshold switch load, or as a percentage of maximum capacity) at each switch residing on one of multiple paths from the host computer to a disk array. The MPM may consider load at the switch as part of the DPS policy, in order to avoid selecting paths through heavily-loaded switches, thereby alleviating and/or avoiding creation of bottlenecks due to an overloaded switch. Such a dynamic path selection policy may be used with either failover or load balancing in order to avoid the types of problems discussed above with respect to FIG. 1A, where static path selection policies were not able to adapt to dynamic shifts in the environment, specifically, with respect to switch load.

Figure 1A:
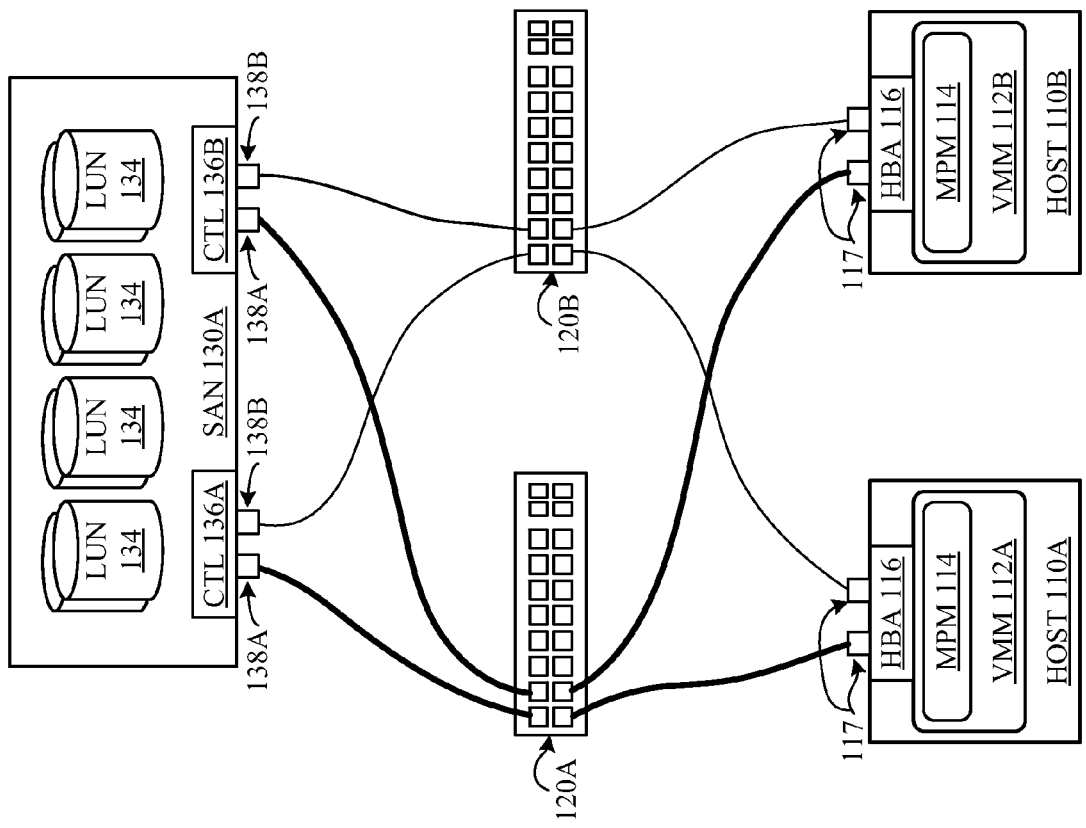
FIG. 1A depicts an example computing environment providing conventional multipathing.
Figure 1B:
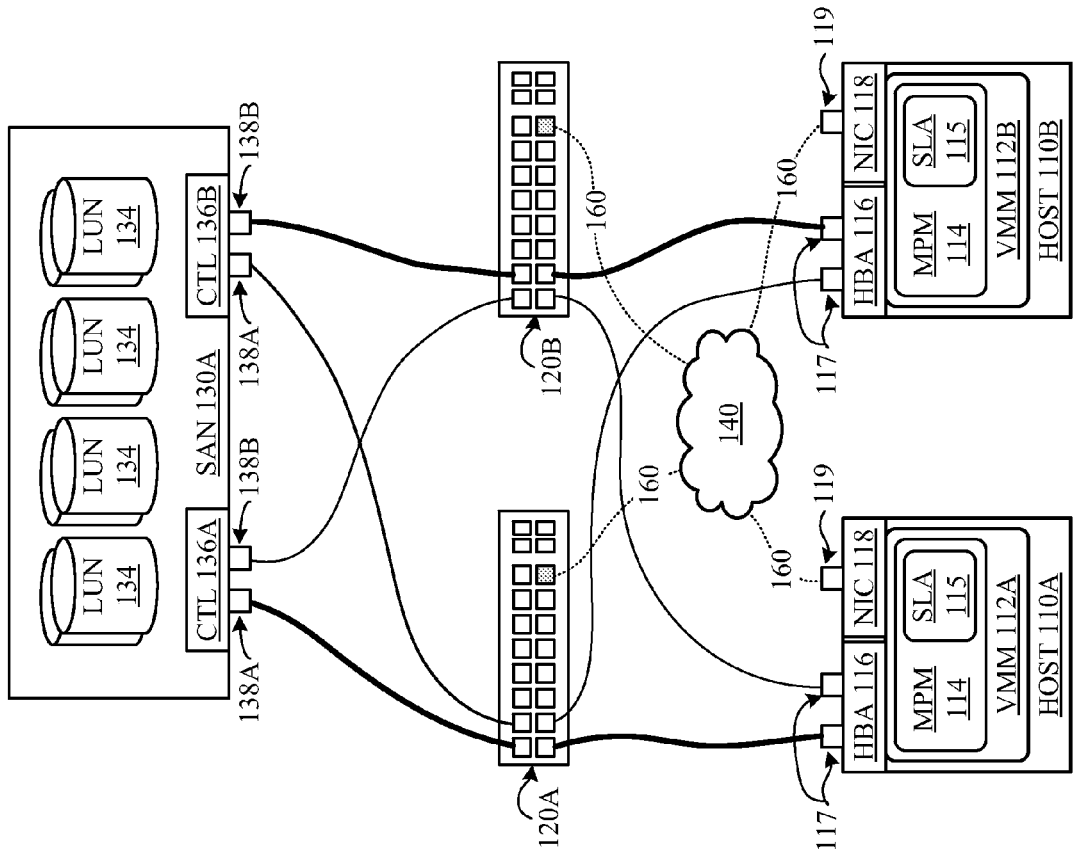
FIG. 1B depicts an example computing environment in which embodiments herein may be practiced.

FIG. 1B depicts an example enterprise-level virtualized computing environment in which a dynamic path selection policy for multipath I/O in a virtualized environment has been implemented. As depicted, FIG. 1B is similar to FIG. 1A except that each MPM module 114 in each hypervisor 112 includes a switch load analyzer (SLA) component 115, that, as further described, below analyzes traffic information received from switches 120 in order to make storage I/O path selection choices. Furthermore, FIG. 1B further depicts a network interface controller (NIC) 118 in each host computer 110 that enables each host computer to establish an "out-of-band" channel 160 through an IP-based network 140 to the IP ports 119 (e.g., Ethernet, etc.) of its connected switches 120. Each of switches 120 are configured to provide a switch management interface (SMI) that provides management information (e.g., switch configuration, load, status, etc.) through this out-of-band channel. In one embodiment in which hypervisor 112 is VMware's vSphere Hypervisor, both the SMI interfaces of the switches as well as MPM modules 114 (via the NIC 118 of its host computer 110) are configured to respectively transmit and receive switch traffic information using VMware's vSphere Storage APIs—Storage Awareness (VASA) (which may itself be enhanced to support switch specific information). It should be recognized that in alternative embodiments, switch 120 may use one of its Fibre Channel ports rather than an Ethernet port to provide its out-of-band channel for its SMI.

Figure 2:
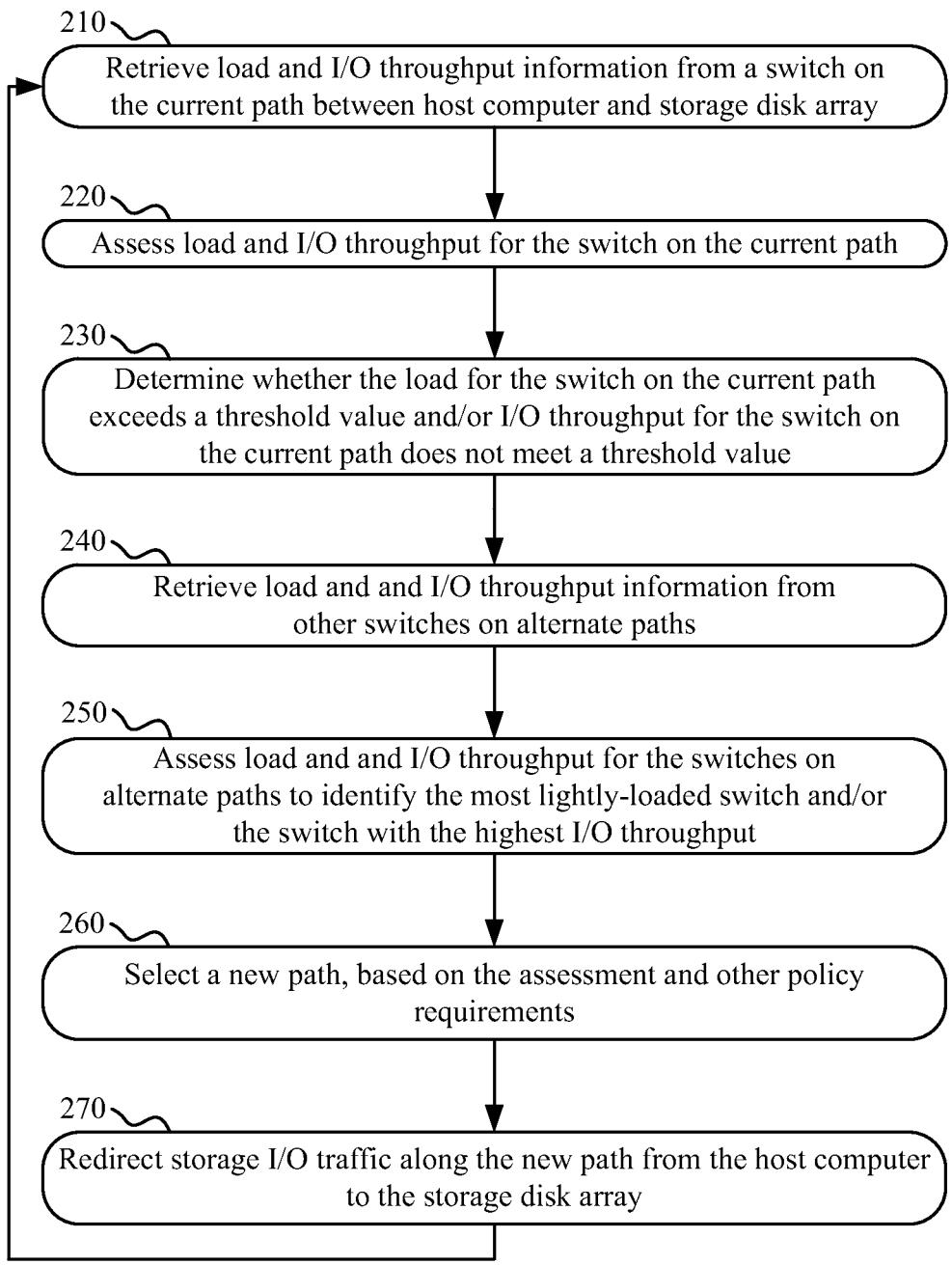
FIG. 2 presents a flowchart illustrating steps in an example method for providing a dynamic path selection (DPS) policy for multipathing.

FIG. 2 presents a flowchart illustrating steps in an example method for providing a dynamic path selection (DPS) policy for multipathing. The DPS policy enables MPM 114 of hypervisor 112 to consider dynamic changes in environment 100, such as changes to switch load and I/O throughput, when evaluating whether to switch from a current storage I/O path between a host computer 110 and SAN 130 to another path. The example method shown in FIG. 2 illustrates an example context for monitoring load and/or I/O throughput at a switch along a current path, determining that a new path should be selected, evaluating alternate paths, and then selecting a new path. MPM 114, having previously either been configured with the multipath topology or performed path discovery, may continually, periodically, or otherwise monitor and analyze switch load and I/O throughput on the current path.

In step 210, MPM 114 retrieves load and I/O throughput information from a switch on the current path between a host computer 110 and a SAN 130. In one embodiment, MPM 114 communicates with switch 120 in its current path through out-of-band channel 160 and may periodically request such load and I/O throughput information over time.

In step 220, MPM 114 assesses the load and I/O throughput information for the switch on the current path. In particular, its switch load analyzer (SLA) 115 forms an evaluation as to whether a threshold value for switch load or a threshold value for I/O throughput has been exceeded (step 230).

In particular embodiments, the threshold value for switch load may be a maximum value. For example, if the load at the switch on the current path is assessed at 20 million packets per second (MPPS), while the threshold value is 13 MPPS, MPM 114 (via SLA 115) may determine that the load information for the switch exceeds the threshold value, and therefore determine that alternate paths should be investigated. In particular embodiments, the threshold value for switch load may be based on some other metrics, such as, for example, a maximum ratio of load at a switch along a current path to the average load at any other switches along any alternate paths between the host computer and the storage disk array. If the evaluation indicates that a ratio of load at the switch along a current path (e.g., 20 MPPS at switch 120A) to the average load at two other switches (of three total) along one or more alternate paths between the host computer and the storage disk array (e.g., average load of 5 MPPS as between the two other switches) exceeds the maximum ratio (e.g., ratio of 20:5 far exceeds a maximum ratio of 4:3), MPM 114 may determine that the load information for the switch exceeds the threshold value, and therefore determine that alternate paths should be investigated.

In particular embodiments, the threshold value for I/O throughput may be a minimum value for I/O throughput along the current path between the host computer and the storage disk array. For example, if the I/O throughput on the current path is assessed at 2450 I/O operations per second (IOPS), while the threshold value is 4000 IOPS, MPM 114 may determine that the I/O throughput on the current path does not meet the threshold value, and therefore determine that alternate paths (through other switches) should be investigated. In particular embodiments, the threshold value for I/O throughput may be based on some additional metrics, such as, for example, a maximum period of time (e.g., 120 seconds) during which a drop in I/O throughput (that at least meets 75% of the threshold value) will be tolerated as long as the frequency of such drops in I/O throughput do not occur more than once every 30 minutes. If the evaluation indicates that the maximum period of time for a drop in I/O throughput has been exceeded or that the maximum frequency of such drops has been exceeded along the current path, MPM 114 may determine that the I/O throughput on the current path does not meet the threshold value, and therefore determine that alternate paths (through other switches) should be investigated.

If MPM 114 determines that the load on the current path does not exceed the threshold value and/or I/O throughput on the current path meets the threshold value, MPM 114 may retain the current path. If, however, the MPM 114 determines that load on the current path exceeds a threshold value and/or I/O throughput on the current path does not meet the threshold value, the MPM 114 may subsequently evaluate alternative paths (e.g., through different switches or ports), for example, based on a DPS policy. In accordance with one such DPS policy, MPM 114 may retrieve load and I/O throughput information (step 240) from other switches on alternate paths between host computer 110 and SDA 130 to identify the most lightly-loaded switch and/or the switch with the highest I/O throughput (step 250). The DSP policy may further assess path topology and other policy requirements, such as a threshold value for switch load from the hypervisor to the storage disk array (e.g., based on I/O Operations Per Second (IOPS)), in order to appropriately handle any number of contexts (e.g., failover, load balancing, load smoothing, path investigation).

According to such a DPS policy, if an alternate path is available through a switch on which the load does not exceed the threshold value for switch load and/or is comparatively less than switch load for the current path, MPM 114 may select the alternate path for the hypervisor (step 260), which then redirects storage I/O traffic to the alternate path (step 270). In particular embodiments, the DPS policy may also (or alternately) require that I/O throughput on the switch along the alternate path exceed I/O throughput on the switch along the current path and/or exceed a set minimum threshold value.

Returning to the example illustrated in FIG. 1B, as in FIG. 1A, the two host computers 110 are still connected to SAN 130 through multiple paths passing through switches 120. However, whereas the static path selection policy implemented by the MPM 114 in FIG. 1A led to a bottleneck at switch 120A, in FIG. 1B, hypervisors 112 running on the two host computers 110 now make better use of the multiple paths available for I/O communication among the two host computers 110. Host computer 110A is the only host computer utilizing a path through switch 120A, and host computer 110B is the only host computer utilizing a path through switch 120B. Since the storage I/O traffic has been distributed amongst both switches, the load at any one switch 120 in FIG. 1B is far lower than the load at switch 120A in FIG. 1A and I/O throughput is improved across all hypervisors 112.

In the event of a failure of a current path, MPM 114 may similarly retrieve and assess load information from switches along alternate paths to identify the most lightly-loaded switch (or the switch with the highest I/O throughput) of the switches along the alternate paths.

In yet another context, MPM 114 may engage in "load smoothing" (i.e., continual load re-balancing) in order to keep load at the various switches relatively equal. In this case, MPM 112 may send a request for load information from all of the switches to identify the most lightly-loaded one of the switches (or the switch with the highest I/O throughput) and automatically switch over to such an identified path passes through that switch.

In embodiments that utilize various VMware vSphere related technologies, vSphere features such as Storage Distributed Resource Scheduler (SDRS), Profile-Driven Storage, and Storage Policy Based Management (SPBM) may be able to access the PSA (e.g., MPM 114) and assess alternate paths and/or trigger alternate path selection according to a DPS policy according to their respective contexts. vSphere's SDRS is a load balancing tool that continuously balances storage space usage and storage I/O load while avoiding resource bottlenecks to meet application service levels. Enabling a load-balancing tool such as SDRS to trigger alternate path selection according to a DPS policy enhances the tool's ability to provide a more extensive load-balancing solution that accounts for load and I/O throughput at the switches connecting host computers to storage disk arrays. vSphere's Profile-Driven Storage provides information on various characteristics of a storage pool, including service-level agreement (SLA), availability, and performance, in the form of a virtual machine storage profile. Enabling a querying tool such as Profile-Driven Storage to assess alternate paths according to the DPS policy enhances the tool's ability to provide additional information about the storage pool that accounts for load and I/O throughput at the switches connecting host computers to storage disk arrays. vSphere's SPBM enables administrators to create storage policies with specific capabilities relating to performance, availability and other services. At deployment time, the administrator selects the appropriate policy for each virtual machine, which SPBM then applies. This ensures that virtual machines are always assigned to the appropriate underlying storage. Enabling a management tool such as SPBM to assess alternate paths according to the DPS policy enhances the tool's ability to assign virtual machines to underlying storage in a manner that accounts for load and I/O throughput at the switches connecting host computers to storage disk arrays.

Although one or more embodiments of the present invention have been described in some detail for clarity of understanding, it will be apparent that certain changes and modifications may be made within the scope of the claims. For example, while the foregoing examples have primarily discussed MPM 114 within a hypervisor 112 of a host computer 110 that supports the running of virtual machines, it should be recognized that the techniques herein can be implemented in non-virtualized environments, where MPM 114 (and the functionality of its SLA 115 component) may be a component of a non-virtualized operating system or an application. For example, other software modules providing multipath I/O capabilities may be utilized in alternate embodiments, such as the Device Mapper (DM) multipath module of the Linux kernel, the Dell Equallogic Multipathing Extension Module, the SOLARIS I/O multipathing module, and the like. Similarly, while the foregoing embodiments have depicted embodiments in which MPM 114 of each host computer 110 communicates directly with each switch 120 to obtain traffic information, it should be recognized that other embodiments have a separate management server receive traffic information from each switch such that host computers communicate with the management server to obtain the traffic information. For example, in one embodiment, VMware's vCenter Server may communicate with the switches to obtain traffic information. Each host computer 110 may, in turn, communicate vCenter Server to obtain such switch traffic information. It should further be understood that the use of a SAN 130 and a Fibre Channel network is also exemplary. Alternative embodiments may use other forms of storage such as NAS or other networks for storage I/O, such as IP based networks using the iSCSI protocol. In another example, while embodiments herein have discussed only load and I/O throughput at the switches when evaluating alternate paths between a host computer 110 and a SDA 130, it should be recognized that the dynamic path selection policy described above may further consider other dynamic aspects of environment 100, such as switch specifications and configuration (e.g., when environment 100 incorporates a heterogeneous group of switches). In another example, while embodiments herein have not discussed network performance requirements (e.g., quality of service) when evaluating alternate paths between a host computer 110 and a SDA 130, it should be recognized that the dynamic path selection policy described above may further consider such additional requirements when selecting an alternate path. It should further be recognized that use of certain terminology that may be more commonly used with certain operating systems than others is merely exemplary not meant to limit the scope of the teachings herein to any particular operating system and that corresponding functions and components in other operating system platforms may benefit from the teachings herein. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer-readable medium include a hard drive, network attached storage (NAS), read-only memory, random-access memory (e.g., a flash memory device), a CD (Compact Disc)—CD-ROM, a CDR, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method for changing a current storage I/O path used by a host computer to access networked storage to an alternative storage I/O path by considering traffic load at a networked switch in the current storage I/O path, wherein the host computer includes a processor, first and second host bus adapter ports, and the current storage I/O path from the host computer to the networked storage is established through the first host bus adapter port and the networked switch, the method comprising:

transmitting a request to the networked switch in the current storage I/O path to provide network load information currently experienced by the networked switch;

receiving network load information from the networked switch; evaluating whether the networked switch is overloaded based on the received network load information;

selecting a new alternative storage I/O path to the networked storage that does not include the networked switch based on the evaluation, the new alternative storage I/O path being established through the second host bus adapter port and a different networked switch that is networked with the second host bus adapter port;

forwarding future storage I/O communications to the networked storage through the second host bus adapter port and using the new alternative storage I/O path; and wherein the evaluating step further comprises comparing the received network load information against a threshold value, and the threshold value is a maximum ratio of load at the networked switch in the current storage I/O path to an average load at any other networked switches including the different networked switch along any alternate storage I/O paths between the host computer and the networked storage.

2. The method of claim 1, wherein the host computer includes a hypervisor that supports running of multiple virtual machines and the method for changing the current storage I/O path is carried out within a module of the hypervisor.

3. The method of claim 1, wherein the request is transmitted and the network load information is received through an out-of-band channel between the host computer and the networked switch, wherein the out-of-band channel is separate from a network used by the host computer and networked storage to conduct I/O.

4. The method of claim 1, wherein the evaluating step further comprises requesting network load information from other networked switches that are networked to the host computer and the networked storage and comparing network load information of the other networked switches to the network load information of the networked switch in the current storage I/O path.

5. The method of claim 1, wherein the selecting step further comprises identifying as the different networked switch a second networked switch that is more lightly loaded than the networked switch in the current storage I/O path.

6. One or more computer-readable non-transitory storage media embodying software to change a current storage I/O path used by a host computer to access networked storage to an alternative storage I/O path by considering traffic load at a networked switch in the current storage I/O path, the host computer comprising a processor and first and second host bus adapter ports, wherein the current storage I/O path from the host computer to the networked storage is established through the first host bus adapter port and the networked switch and the processor is configured to execute the software to:

transmit a request to the networked switch in the current storage I/O path to provide network load information currently experienced by the networked switch;

receive network load information from the networked switch;

evaluate whether the networked switch is overloaded based on the received network load information;

select a new alternative storage I/O path to the networked storage that does not include the networked switch based on the evaluation, the new alternative storage I/O path being established through the second host bus adapter port and a different networked switch that is networked with the second host bus adapter port;

forward future storage I/O communications to the networked storage through the second host bus adapter port and using the new alternative storage I/O path; and wherein the processor is configured to execute the software to evaluate whether the networked switch is overloaded by comparing the received network load information against a threshold value, and the threshold value is a maximum ratio of load at the networked switch in the current storage I/O path to an average load at any other networked switches including the different networked switch along any alternate storage I/O paths between the host computer and the networked storage.

7. The media of claim 6, wherein the software comprises a multipathing module in a hypervisor of the host computer that supports the running of multiple virtual machines.

8. The media of claim 6, wherein the request is transmitted and the network load information is received through an out-of-band channel between the host computer and the networked switch, wherein the out-of-band channel is separate from a network used by the host computer and networked storage to conduct I/O.

9. The media of claim 6, wherein the processor is configured to execute the software to evaluate whether the networked switch is overloaded by requesting network load information from other networked switches that are networked to the host computer and the networked storage and comparing the network load information of the other networked switches to the network load information of the networked switch in the current storage I/O path.

10. The method of claim 6, wherein the processor is configured to execute the software to select a new alternative storage I/O path by identifying as the different networked switch a second networked switch that is more lightly loaded than the networked switch in the current storage I/O path.

11. A host computer comprising:
one or more processors;
first and second host bus adapter ports; and
a memory coupled to the processors comprising instructions executable by the processors to change a current storage I/O path used by the host computer to access networked storage to an alternative storage I/O path by considering traffic load at a networked switch in the current storage I/O path, wherein the current storage I/O path from the host computer to the networked storage is established through the first host bus adapter port and the networked switch and the processors execute the instructions to:
transmit a request to the networked switch in the current storage I/O path to provide network load information currently experienced by the networked switch;
receive network load information from the networked switch; evaluate whether the networked switch is overloaded based on the received network load information;
select a new alternative storage I/O path to the networked storage that does not include the networked switch based on the evaluation, the new alternative storage I/O path being established through the second host bus adapter port and a different networked switch that is networked with the second host bus adapter port;
forward future storage I/O communications to the networked storage through the second host bus adapter port and using the new alternative storage I/O path; and
wherein the executed instructions to evaluate whether the networked switch is overloaded further comprise instructions to compare the received network load information against a threshold value and the threshold value is a maximum ratio of load at the networked switch in the current storage I/O path to an average load at any other networked switches including the different networked switch along any alternate storage I/O paths between the host computer and the networked storage.

12. The host computer of claim 11, wherein the instructions are part of a multipathing module within a hypervisor of the host computer that supports running of multiple virtual machines.

13. The host computer of claim 11, wherein the request is transmitted and the network load information is received through an out-of-band channel between the host computer and the networked switch, wherein the out-of-band channel is separate from a network used by the host computer and networked storage to conduct I/O.

14. The host computer of claim 11, wherein the executed instructions to evaluate whether the networked switch is overloaded further comprise instructions to request network load information from other networked switches that are networked to the host computer and the networked storage and comparing network load information of the other networked switches to the network load information of the networked switch in the current storage I/O path.

15. The host computer of claim 11, wherein the executed instructions to select a new alternative storage I/O path further comprise instructions to identify as the different networked switch a second networked switch that is more lightly loaded than the networked switch in the current storage I/O path.

* * * * *